(12) United States Patent
Ling et al.

(10) Patent No.: US 11,305,581 B2
(45) Date of Patent: Apr. 19, 2022

(54) DRIVE AXLE LOCKING DEVICE, POWER-DRIVE SYSTEM, AND VEHICLE

(71) Applicant: BYD COMPANY LIMITED, Guangdong (CN)

(72) Inventors: Heping Ling, Shenzhen (CN); Zhen Zhai, Shenzhen (CN); Changan Huang, Shenzhen (CN); Yongmeng Luo, Shenzhen (CN)

(73) Assignee: BYD COMPANY LIMITED

( * ) Notice: Subject to any disclaimer, the term of this patent is extended or adjusted under 35 U.S.C. 154(b) by 369 days.

(21) Appl. No.: 16/474,244

(22) PCT Filed: Dec. 15, 2017

(86) PCT No.: PCT/CN2017/116612
§ 371 (c)(1),
(2) Date: Jun. 27, 2019

(87) PCT Pub. No.: WO2018/121296
PCT Pub. Date: Jul. 5, 2018

(65) Prior Publication Data
US 2019/0358999 A1 Nov. 28, 2019

(30) Foreign Application Priority Data
Dec. 27, 2016 (CN) .......................... 201611226794.9

(51) Int. Cl.
*B60K 7/00* (2006.01)
*B60B 35/14* (2006.01)
(Continued)

(52) U.S. Cl.
CPC ............ *B60B 35/14* (2013.01); *B60K 7/0007* (2013.01); *B60K 17/356* (2013.01); *F16D 11/14* (2013.01); *F16H 1/28* (2013.01)

(58) Field of Classification Search
CPC .... B60K 7/0007; B60K 17/356; B60K 17/02; B60K 17/04; B60B 35/14; F16D 11/14;
(Continued)

(56) References Cited

U.S. PATENT DOCUMENTS 3,831,462 A * 8/1974 Baremor ................ B60K 17/20
475/87
4,507,984 A    4/1985 Goscenski
(Continued)

FOREIGN PATENT DOCUMENTS

CN          1014155 A     4/2009
CN        101519040 A     9/2009
(Continued)

OTHER PUBLICATIONS

International Search Report and Written Opinion for PCT Application No. PCT/CN2017/116612, dated Mar. 14, 2018, 10 pages.

*Primary Examiner* — David J Hlavka (57) ABSTRACT

The present specification discloses a drive shaft locking device, a power-driven system, and a vehicle. The drive shaft locking device comprises a planetary gear mechanism comprising a sun gear, a planetary gear, a planetary carrier, and a gear ring. A first drive shaft is connected with one of the sun gear, the planetary carrier, and the gear ring, and a second drive shaft is connected with another one of the sun gear, the planetary carrier, and the gear ring. A power joint device comprises a first joint part and a second joint part. The first drive shaft and the first joint part synchronously rotate, and the second drive shaft and the second joint part synchronously rotate. A joint part drive comprises a drive part to drive a drive needle for joining the second joint part with the first joint part along the axial direction.

20 Claims, 8 Drawing Sheets

(51) Int. Cl.
*B60K 17/356* (2006.01)
*F16D 11/14* (2006.01)
*F16H 1/28* (2006.01)

(58) Field of Classification Search
CPC    F16H 1/28; F16H 48/34; B62D 11/02; B62D 11/04
See application file for complete search history.

(56)      References Cited

U.S. PATENT DOCUMENTS

| | | | |
|---|---|---|---|
| 7,438,661 B2 * | 10/2008 | Kyle | ................ F16H 48/08 475/232 |
| 2009/0186738 A1 | 7/2009 | Ikushima et al. | |
| 2010/0304916 A1 | 12/2010 | Curtis | |
| 2015/0107933 A1 | 4/2015 | Gopal et al. | |

FOREIGN PATENT DOCUMENTS

| | | | |
|---|---|---|---|
| CN | 104565278 A | 4/2015 |
| CN | 204755825 U | 11/2015 |
| CN | 105459781 A | 4/2016 |
| CN | 105485291 A | 4/2016 |
| CN | 105697712 A | 6/2016 |
| CN | 205350248 U | 6/2016 |
| CN | 106246861 A | 12/2016 |
| CN | 106438916 A | 2/2017 |

* cited by examiner

Left ⟵⟶ Right

DRIVE AXLE LOCKING DEVICE, POWER-DRIVE SYSTEM, AND VEHICLE

CROSS-REFERENCE TO RELATED APPLICATIONS

This application is a national phase application of International Application No. PCT/CN2017/116612, filed on Dec. 15, 2017, which is based on and claims the priority to and benefits of Chinese Patent Application Serial No. 201611226794.9, filed to the State Intellectual Property Office of P. R. China on Dec. 27, 2016. The entire content of all of the above-referenced applications is incorporated herein by reference.

FIELD

The present specification relates to the technical field of vehicles, and particularly relates to a drive axle/shaft locking device for a vehicle, a power-driven system with the drive axle/shaft locking device, and a vehicle with the power-driven system.

BACKGROUND

In related automobile technologies, a new energy vehicle may utilize a distributed drive mode. Wheels at two sides of the vehicle are respectively driven by two motors. The rotation speeds and torques of the wheels at left and right sides can be independently adjusted by a controller, thereby canceling a differential mechanism. However, when the road is slippery, a left half shaft and a right half shaft still need to be locked to improve mobility of the vehicle. If a conventional electric locking differential mechanism is applied to the new energy vehicle with a distributed-drive mode, the differential function of the differential mechanism may be wasted. Furthermore, the conventional electric locking differential mechanism has a complicated structure with more parts and occupies a larger space.

SUMMARY

An objective of the present specification is to solve the technical problems in the related art. Therefore, the present specification provides a drive shaft locking device suitable for an electric vehicle. The drive shaft locking device can lock two drive shafts together to improve the vehicle mobility at difficult driving conditions.

Some embodiments of the present specification further provide a power-driven system.

Some embodiments of the present specification further provide a vehicle.

The drive shaft locking device provided by some embodiments of the present specification may comprise a planetary gear mechanism, wherein the planetary gear mechanism comprises a sun gear, a planetary gear, a planetary carrier, and a gear ring. The drive shaft locking device may further comprise a first drive shaft, a second drive shaft, and a power joint device. The power joint device comprises a first joint part and a second joint part. The first drive shaft is connected with one of the sun gear, the planetary carrier, and the gear ring. The first drive shaft is further configured to synchronously rotate with the first joint part. The second drive shaft is connected with another one of the sun gear, the planetary carrier, and the gear ring. The second drive shaft is further configured to synchronously rotate with the second joint part. The drive shaft locking device may further comprise a joint part drive device, wherein the joint part drive device comprises a drive needle and a drive part. The drive needle is configured to be capable of rotating around a central axis of the sun gear along with the remaining one of the sun gear, the planetary carrier, and the gear ring, and be capable of moving along the axial direction of the remaining one of the sun gear, the planetary carrier, and the gear ring. Two ends of the drive needle are respectively matched with the drive part and the second joint part, and the drive part is configured to be used for driving the drive needle to drive the second joint part to move towards the direction close to the first joint part along the axial direction, so that the second joint part is jointed with the first joint part.

According to the drive shaft locking device provided by some embodiments of the present specification, when the first joint part is jointed with the second joint part, the first drive shaft and the second drive shaft are mutually locked, and the first drive shaft and the second drive shaft can synchronously rotate, thereby being favorable for the vehicle to get out of the slippery condition. Furthermore, the locking of the first drive shaft and the second drive shaft can be implemented by the joint part drive device and the power joint device. Thus, the drive shaft locking device has the advantages of a simple structure, reliable functional implementation, few parts, a small size, and a low cost.

In addition, the drive shaft locking device provided by some embodiments of the present specification can also have the following distinguishing technical features.

In some embodiments of the present specification, the drive part comprises a following part, wherein the following part can rotate along with the drive needle, and the following part can be braked. The following part is provided with a drive surface. When the following part is braked, the drive surface drives the drive needle to move along the axial direction by sliding the drive needle on the drive surface, so that the second joint part is jointed with the first joint part.

In some embodiments of the present specification, the drive part further comprises a braking part, wherein the braking part is configured to be used for braking the following part.

In some embodiments of the present specification, the braking part is configured to brake the following part by means of an electromagnetic force.

In some embodiments of the present specification, the drive part is an electromagnetic brake, the following part constitutes a braking component of the electromagnetic brake, and the braking part constitutes a braking frame of the electromagnetic brake.

In some embodiments of the present specification, the following part hollowly sleeves the first drive shaft.

In some embodiments of the present specification, the drive surface is an inclined surface or a curved surface.

In some embodiments of the present specification, the drive surface comprises a first section and a second section, wherein the first section is connected with the second section, the connection part of the first section and the second section is the lowest point, and the other ends of the first section and the second section opposite from the connection part are the highest points.

In some embodiments of the present specification, the following part comprises a following part body and an annular following part flange arranged on the following part body, wherein the end surface of the following part flange facing the drive needle is provided with the drive surface.

In some embodiments of the present specification, the drive surface is provided with a drive surface limiting groove, and one end of the drive needle is positioned in the drive surface limiting groove.

In some embodiments of the present specification, the first drive shaft is connected with the sun gear, the second drive shaft is connected with the gear ring, and the drive needle penetrates through the planetary carrier. The planetary gear is mounted on the planetary carrier by means of a planetary gear shaft, and the drive needle and the planetary gear shaft are the same component.

In some embodiments of the present specification, the first drive shaft is connected with the sun gear, and the second drive shaft is connected with the gear ring. Two planetary carriers are provided and are respectively arranged at two sides of the sun gear, and the drive needle penetrates through the two planetary carriers.

In some embodiments of the present specification, the first drive shaft is connected with the sun gear, the second drive shaft is connected with the gear ring, and the drive needle penetrates through the planetary carrier. The drive shaft locking device further comprises a sleeve, wherein the sleeve is connected between the gear ring and the second drive shaft, and the second joint part rotates along with the sleeve and can move along the axial direction relative to the sleeve.

In some embodiments of the present specification, the sleeve is provided with a sleeve axial groove, the second joint part is provided with a second joint part bulge. The second joint part bulge is arranged in the sleeve axial groove, so that the second joint part can rotate along with the sleeve and can move along the axial direction relative to the sleeve.

In some embodiments of the present specification, the second joint part hollowly sleeves the first drive shaft.

In some embodiments of the present specification, both the first joint part and the second joint part are contained in the sleeve.

In some embodiments of the present specification, the drive shaft locking device further comprises elastic devices, wherein the elastic devices elastically press against the second joint part so as to enable the second joint part to move away from the first joint part.

In some embodiments of the present specification, the end surface of the first drive shaft close to the second drive shaft is provided with a first drive shaft flange. The first drive shaft flange is opposite to the second joint part, and the elastic devices elastically press between the first drive shaft flange and the second joint part.

In some embodiments of the present specification, the elastic devices are spiral springs and sleeve the first drive shaft.

In some embodiments of the present specification, the first joint part sleeves is fixed on the first drive shaft, and the spiral springs are positioned at the outer side of the first joint part.

In some embodiments of the present specification, the elastic devices are contained in the sleeve.

In some embodiments of the present specification, the first joint part is provided with a plurality of first joint teeth distributed along the circumferential direction, and the second joint part is provided with a plurality of second joint teeth distributed along the circumferential direction.

In some embodiments of the present specification, the second joint part is provided with a second joint part limiting groove, and one end of the drive needle is positioned in the second joint part limiting groove.

In some embodiments of the present specification, the gear ring has an integrally-formed annular extension part, and the annular extension part constitutes the sleeve.

In some examples of the present specification, a plurality of arc-shaped connecting strips is arranged between the gear ring and the sleeve. The plurality of arc-shaped connecting strips is distributed at intervals along the circumferential direction and is respectively welded and fixed with the gear ring and the sleeve.

In some examples of the present specification, the first drive shaft is connected with the sun gear, the second drive shaft is connected with the gear ring, and the drive needle penetrates through the planetary carrier. The planetary carrier is provided with a plurality of convex plates which is distributed at intervals along the circumferential direction. The plurality of convex plates is divided into first convex plates and second convex plates. The plurality of first convex plates and the plurality of second convex plates are staggered in the circumferential direction, the first convex plates are used for mounting the planetary gear shaft, and the second convex plates are provided with drive needle support holes for supporting the drive needle.

In some examples of the present specification, the first drive shaft is connected with the planetary carrier, the second drive shaft is connected with the sun gear, the gear ring is provided with a drive needle axial groove, and the drive needle is slidably arranged in the drive needle axial groove.

In some examples of the present specification, the first drive shaft is connected with the planetary carrier, the second drive shaft is connected with the gear ring. The drive needle penetrates through the sun gear and can rotate along with the sun gear around the central axis of the sun gear; and the planetary carrier encircles the electromagnetic brake.

The power-driven system provided by the present specification comprises: the drive shaft locking device for the vehicle; a first motor generator, wherein the first motor generator is in transmission with the first drive shaft and outputs power to one of a pair of wheels; and a second motor generator, wherein the second motor generator is in transmission with the second drive shaft and outputs power to the other one of the pair of wheels.

The power-driven system provided by the present specification comprises: two drive shaft locking devices for the vehicle; a first motor generator, wherein the first motor generator is in transmission with the first drive shaft of one of the two drive shaft locking devices and outputs power to the left front wheel; a second motor generator, wherein the second motor generator is in transmission with the second drive shaft of the one of the two drive shaft locking devices and outputs power to the right front wheel; a third motor generator, wherein the third motor generator is in transmission with the first drive shaft of the other one of the two drive shaft locking devices and outputs power to the left rear wheel; and a fourth motor generator, wherein the fourth motor generator is in transmission with the second drive shaft of the other one of the two drive shaft locking devices and outputs power to the right rear wheel.

The benefits of the power-driven system are similar to those of the drive shaft locking device, so that the descriptions are not repeated herein.

The vehicle provided by some embodiments of the present specification comprises the power-driven system.

The benefits of the vehicle are similar to those of the power-driven system, so that the descriptions are not repeated herein.

REFERENCE NUMERALS OF THE ACCOMPANYING DRAWING

Power-driven system 1000;

Drive shaft locking device 100;

Planetary gear mechanism 10; Sun gear 11; Planetary gear 12; Planetary carrier 13; First convex plate 131; Second convex plate 132;

Gear ring 14; Drive needle axial groove 141;

First drive shaft 20; First drive shaft flange 21;

Second drive shaft 30;

Power joint device 40; First joint part 41; First joint tooth 411; Second joint part 42; Second joint part bulge 421; Second joint tooth 422;

Joint part drive device 50; Drive needle 51; Drive part 52; Following part 521; Following part body 521a; Following part flange 521b;

Braking part 522;

Drive surface 523; First section 523a; Second section 523b; Drive surface limiting groove 523c;

Sleeve 60; Sleeve axial groove 61; Arc-shaped connecting strip 62;

Elastic device 70;

First motor generator D1; Second motor generator D2; Third motor generator D3; Fourth motor generator D4;

Left front wheel Z1; Left rear wheel Z2; Right front wheel Y1; Right rear wheel Y2.

DETAILED DESCRIPTION

The embodiments of the present specification are described in detail below and shown in the drawings. The following embodiments described with reference to the accompanying drawings are exemplary to describe the present specification and should not be construed as limitations to the present specification.

A drive shaft locking device 100 according to the embodiments of the present specification is described in detail below with reference to the accompanying drawings. The drive shaft locking device 100 can be applied to a vehicle, particularly to a new energy vehicle utilizing distributed drive. The drive shaft locking device 100 can be used for locking two drive shafts to enable left and right wheels to synchronously rotate, thereby greatly improving the mobility of the vehicle to get out of difficult driving conditions (i.e., a slippery road). The vehicle can be, but is not limited to, an electric vehicle.

Figure 1:
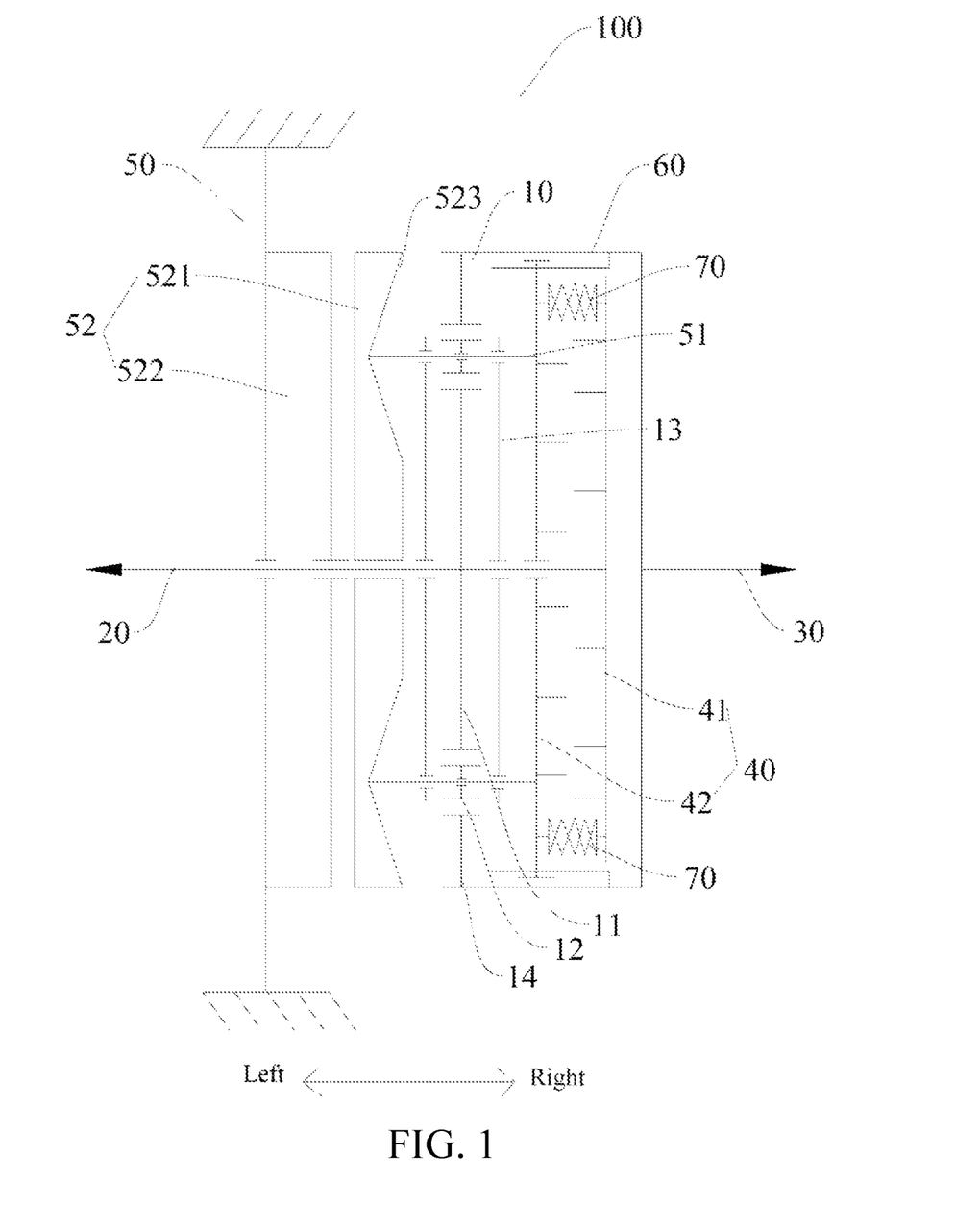
FIG. 1 is a schematic diagram of a drive shaft locking device according to an embodiment of the present specification.
Figure 2:
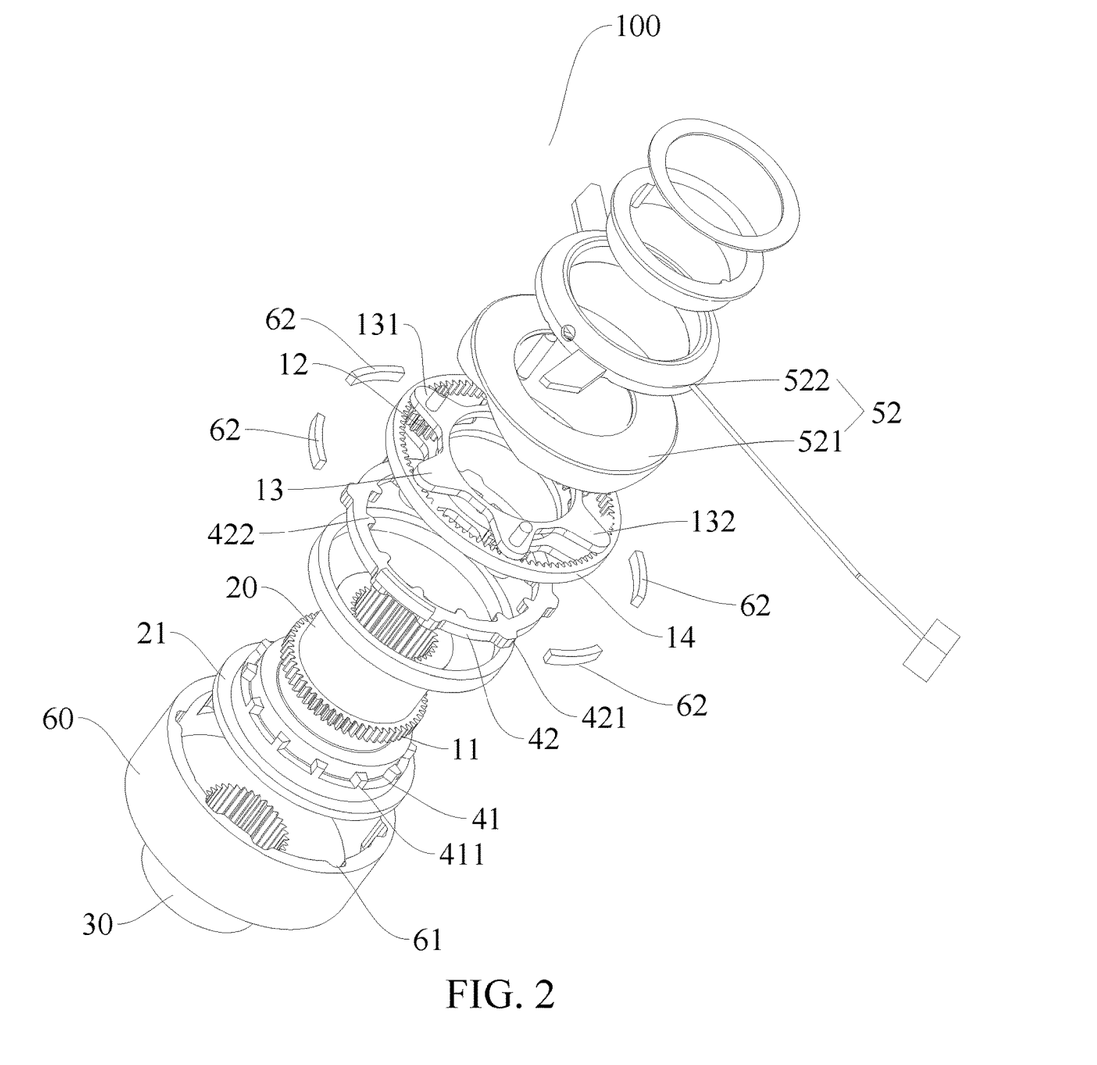
FIG. 2 is an exploded diagram of a drive shaft locking device according to an embodiment of the present specification.

As shown in FIG. 1 and FIG. 2, the drive shaft locking device 100 according to the embodiments of the present specification can comprise a planetary gear mechanism 10, a first drive shaft 20, a second drive shaft 30, a power joint device 40, and a joint part drive device 50.

The planetary gear mechanism 10 comprises a sun gear 11, a planetary gear 12, a planetary carrier 13, and a gear ring 14. The planetary gear 12 can be rotationally mounted on the planetary carrier 13, and the planetary gear 12 is meshed between the sun gear 11 and the gear ring 14 to transmit power between the sun gear 11 and the gear ring 14. A plurality of planetary gears 12 (e.g., three planetary gears) can be uniformly distributed with respect to the central axis of the sun gear 11. A planetary gear shaft can be mounted on the planetary carrier 13, and the planetary gear 12 can be mounted on the planetary gear shaft.

The first drive shaft 20 and the second drive shaft 30 are two independent shafts. For example, the first drive shaft 20 can be, but is not limited to, in transmission with a left wheel, and the second drive shaft 30 can be, but is not limited to, in transmission with a right wheel. The axis of the first drive shaft 20 and the axis of the second drive shaft 30 can be collinear. For another example, the first drive shaft 20 can be a right half shaft, and the second drive shaft 30 can be a left half shaft.

The power joint device 40 comprises a first joint part 41 and a second joint part 42. The first drive shaft 20 is connected with one of the sun gear 11, the planetary carrier 13, and the gear ring 14. The first drive shaft 20 is configured to synchronously rotate (i.e., rotate at the same speed and in the same direction) with the first joint part 41. The second drive shaft 30 is connected with another one of the sun gear 11, the planetary carrier 13, and the gear ring 14. The second drive shaft 30 is configured to synchronously rotate with the second joint part 42.

The joint part drive device 50 can comprise a drive needle 51 and a drive part 52. The drive needle 51 is configured to rotate around the central axis of the sun gear 11 along with the remaining one of the sun gear 11, the planetary carrier 13, and the gear ring 14, and to move along the axial direction relative to the remaining one of the sun gear 11, the planetary carrier 13, and the gear ring 14.

For example, as shown in FIG. 1, the first drive shaft 20 can be connected with the sun gear 11, so that the first drive shaft 20 and the sun gear 11 can synchronously rotate. Therefore, the first drive shaft 20, the sun gear 11, and the first joint part 41 can synchronously rotate. The second drive shaft 30 can be connected with the gear ring 14, so that the second drive shaft 30 and the gear ring 14 can synchronously rotate. Therefore, the second drive shaft 30, the gear ring 14, and the second joint part 42 can synchronously rotate. The drive needle 51 can revolve around the central axis of the sun gear 11 along with the planetary carrier 13, and the drive needle 51 can move along the axial direction relative to the planetary carrier 13. In other words, the drive needle 51 and the planetary carrier 13 can synchronously rotate, meanwhile, the drive needle 51 can move along the axial direction relative to the planetary carrier 13, such that the drive needle 51 penetrates through the planetary carrier 13. Therefore, the planetary carrier 13 can drive the drive needle 51 to synchronously rotate without hindering the axial movement of the drive needle 51.

Figure 9:
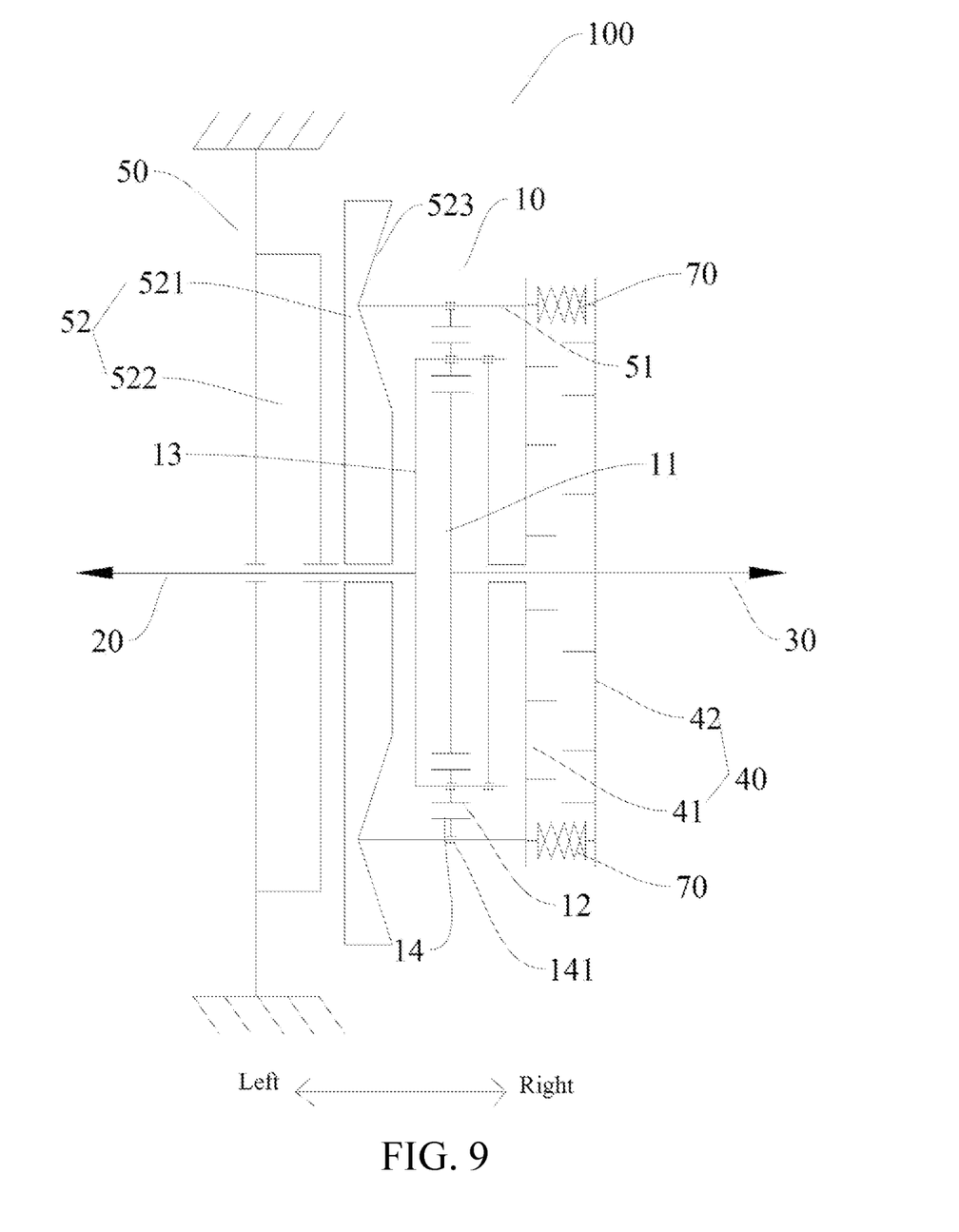
FIG. 9 is a schematic diagram of a drive shaft locking device according to another embodiment of the present specification.

Furthermore, as shown in FIG. 9, the first drive shaft 20 can be connected with the planetary carrier 13, the second drive shaft 30 can be connected with the sun gear 11, the gear ring 14 is provided with a drive needle axial groove 141, and the drive needle 51 can be slidably arranged in the drive needle axial groove 141.

Figure 10:
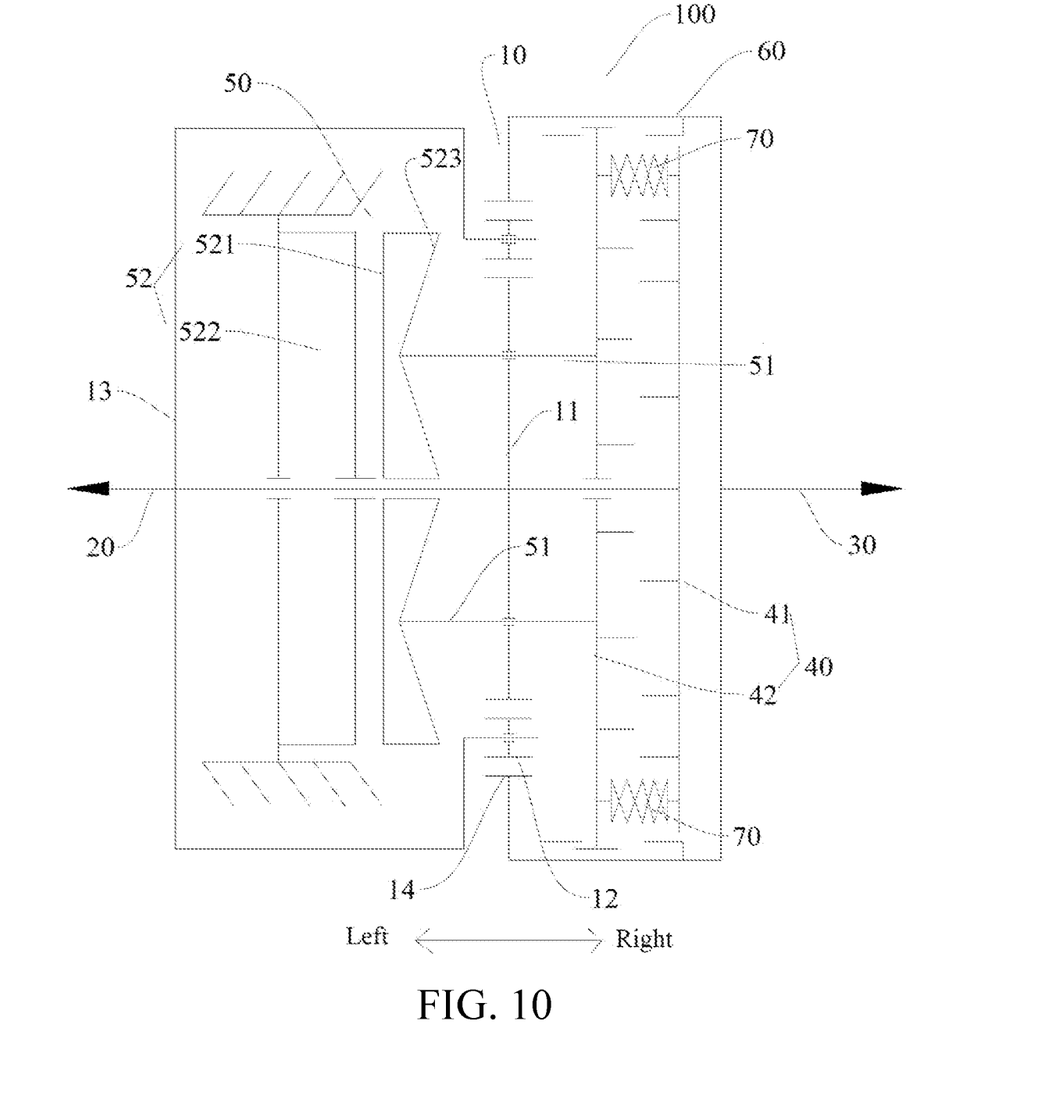
FIG. 10 is a schematic diagram of a drive shaft locking device according to still another embodiment of the present specification.

Furthermore, as shown in FIG. 10, the first drive shaft 20 can be connected with the planetary carrier 13, and the second drive shaft 30 can be connected with the gear ring 14. The drive needle 51 penetrates through the sun gear 11, and the drive needle 51 can rotate along with the sun gear 11 around the central axis of the sun gear 11, i.e., the drive needle 51 can revolve along with the sun gear 11 around the central axis of the sun gear 11.

Two ends of the drive needle 51 may respectively match with the drive part 52 and the second joint part 42. The drive part 52 is configured to drive the drive needle 51 to drive the second joint part 42 moving towards the first joint part 41 (from left to right as shown in FIG. 1) along the axial direction, so that the second joint part 42 can join the first joint part 41.

In other words, the remaining one of the sun gear 11, the planetary carrier 13 and the gear ring 14 (e.g., the planetary carrier 13 as shown in FIG. 1) can drive the drive needle 51 to synchronously rotate therewith. The drive part 52 can drive the drive needle 51 to move from left to right. Because one end of the drive needle 51 fits with the second joint part 42, the drive needle 51 can synchronously drive the second joint part 42 to move from left to right. The second joint part 42 can continuously approach the first joint part 41 until the second joint part 42 is jointed with the first joint part 41. When the first joint part 41 is jointed with the second joint part 42, the first drive shaft 20 and the second drive shaft 30 are mutually locked, and the first drive shaft 20 and the second drive shaft 30 can synchronously rotate. The power at the sliding side of the vehicle can be output through the other side to help the vehicle to get out of the sliding situation.

A conventional electric locking differential mechanism is formed by adding an electric drive locking mechanism on a common open differential mechanism, so that the differential mechanism has a locking function, and the locking is achieved by electrical control of the differential mechanism. The electric locking differential mechanism is usually applied to a fuel vehicle of centralized drive type, wherein the power is distributed to the left half shaft and the right half shaft through a main reducing gear and the differential mechanism, respectively. The speed difference between the left wheel and the right wheel is adjusted by the differential mechanism. However, the electric locking differential mechanism cannot be directly applied to an electric vehicle, since the electric vehicle does not have an engine, and the size of the electric locking differential mechanism is too large.

Therefore, the drive shaft locking device 100 provided by the embodiments of the present specification is significantly different from the conventional electric locking differential mechanism both in structure and implementation. Furthermore, the locking of the first drive shaft 20 and the second drive shaft 30 can be implemented by the joint part drive device 50 and the power joint device 40. The drive shaft locking device 100 has the advantages of a simple structure, reliable function implementation, few parts, a small size, and a low cost.

As shown in FIG. 1, the planetary gear mechanism 10, the power joint device 40, the first drive shaft 20, and the second drive shaft 30 are coaxially arranged. Therefore, the drive shaft locking device 100 can have a small radial size and a small overall size, and occupy a small space.

As shown in FIG. 1, the drive part 52 can comprise a following part 521, wherein the following part 521 can rotate along with the drive needle 51 or can be braked. The following part 521 is provided with a drive surface 523. When the following part 521 is braked, the contact matching position of the drive needle 51 and the drive surface 523 is changed when the drive needle 51 slides on the drive surface 523. The drive surface 523 drives the drive needle 51 to move along the axial direction so that the second joint part 42 may join with the first joint part 41. It can be understood that before the following part 521 is braked, the following part 521 and the drive needle 51 can synchronously rotate. After the following part 521 is braked, the rotation speed of the following part 521 is reduced. A rotation speed difference between the following part 521 and the drive needle 51 may cause the drive needle 51 slide on the drive surface 523 of the following part 521. When sliding, the drive needle 51 can move along the axial direction relative to the planetary carrier 13 to drive the second joint part 42 to gradually approach the first joint part 41 until the second joint part 42 is jointed with the first joint part 41.

Further, as shown in FIG. 1, the drive part 52 can comprise a braking part 522 configured to brake the following part 521. In other words, the braking part 522 is capable of braking the following part 521. When the first joint part 41 and the second joint part 42 need to be jointed, the braking part 522 may brake the following part 521.

Preferably, the braking part 522 can be configured to brake the following part 521 by an electromagnetic force. The electromagnetic force may be precisely and reliably controlled to improve the working reliability and prolong the service life of the drive shaft locking device 100. For example, the drive part 52 can be an electromagnetic brake, the following part 521 may constitute a braking component of the electromagnetic brake, and the braking part 522 may constitute a braking frame of the electromagnetic brake. By using a control mode of the electromagnetic brake and the planetary gear mechanism, the control system of the drive shaft locking device 100 can be simplified, and the system reliability can be improved.

Specifically, as shown in FIG. 10, when the drive shaft locking device 100 has the structure that the first drive shaft 20 is connected with the planetary carrier 13, the second drive shaft 30 is connected with the gear ring 14, and the drive needle 51 penetrates through the sun gear 11 and rotates along with the sun gear 11 around the central axis of the sun gear 11, the planetary carrier 13 can encircle the electromagnetic brake. The planetary carrier 13 and the electromagnetic brake may be reasonably arranged to improve reliability of the structure of the drive shaft locking device 100.

In the present specification, because the planetary carrier 13 encircles the electromagnetic brake, the power supply mode of the electromagnetic brake is different from a conventional power supply mode. For example, a rotational power supply structure or an electric brush ring structure in the motor field can be adopted.

In some embodiments of the present specification, as shown in FIG. 1, the following part 521 can hollowly sleeve the first drive shaft 20. Therefore, the matching between the following part 521 and the drive needle 51 can be further facilitated, the axial length of the drive shaft locking device 100 can be reduced, and the size of the drive shaft locking device 100 can be also reduced.

Figure 4:
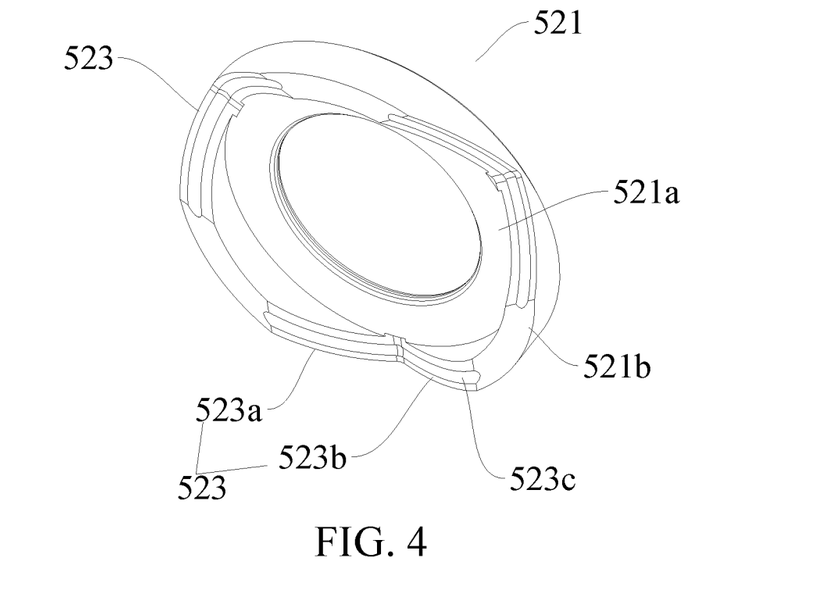
FIG. 4 is a structural diagram of a following part according to an embodiment of the present specification.

According to an embodiment of the present specification, as shown in FIG. 4, the drive surface 523 can be an inclined surface or a curved surface to facilitate the drive needle 51 to slide on the drive surface 523 and move along the axial direction.

Further, As shown in FIG. 4, the drive surface 523 can comprise a first section 523a and a second section 523b, wherein the first section 523a is connected with the second section 523b at a connection part. The connection part of the first section 523a and the second section 523b is the lowest point, and the other ends of the first section 523a and the second section 523b opposite from the connection part are the highest points. Therefore, when one end of the drive needle 51 is positioned at the lowest point, the first joint part 41 and the second joint part 42 are separated. When one end of the drive needle 51 is positioned at the highest points or is adjacent to the highest points, the first joint part 41 and the second joint part 42 are jointed. By reasonably arranging the drive surface 523, the drive needle 51 can slide between the lowest point and the highest points to join the first joint part 41 with the second joint part 42 to improve the reliability of the drive shaft locking device 100.

Preferably, each of the first section 523a and the second section 523b can be of a circular arc to facilitate the sliding of one end of the drive needle 51 on the drive surface 523, and to reduce the moving resistance of the drive needle 51.

In some embodiments of the present invention, each of the first section 523a and the second section 523b has the same center angle. Thus, the first section 523a and the second section 523b are basically identical, thereby further facilitating the sliding of the drive needle 51 on the drive surface 523.

In some embodiments, multiple sections of drive surfaces 523 can be provided and distributed at intervals along the circumferential direction. The number of the drive needles 51 can be increased with respect to the number of the drive surfaces 523. A plurality of drive needles 51 can be reliably matched with the second joint part 42. Thus, the second joint part 42 can reliably move along the axial direction, and the operation of the drive shaft locking device 100 is more reliable.

Multiple sections of drive surfaces 523 can be connected by a connection plane, and the connection plane is flush with the highest points. Thus, the structural reliability of the drive surface 523 of the following part 521 can be improved to further improve the structural reliability of the drive shaft locking device 100.

According to an embodiment of the present specification, as shown in FIG. 4, the following part 521 can comprise a following part body 521a and an annular following part flange 521b arranged on the following part body 521a, wherein the drive surface 523 is arranged on the end surface of the following part flange 521b facing the drive needle 51. The following part body 521a can effectively enhance the structural reliability of the following part 521. The drive surface 523 can be arranged on the end surface of the following part flange 521b to reduce the design difficulty of the drive surface 523 and to improve the structural reliability of the drive surface 523.

Further, as shown in FIG. 4, the drive surface 523 can be provided with a drive surface limiting groove 523c, and one end of the drive needle 51 is positioned in the drive surface limiting groove 523c. By forming the drive surface limiting groove 523c, one end of the drive needle 51 can fit in the drive surface limiting groove 523c to prevent the one end of the drive needle 51 from being separated from the drive surface 523, and to improve the reliability and stability of the drive needle 51 moving on the drive surface 523.

Figure 3:
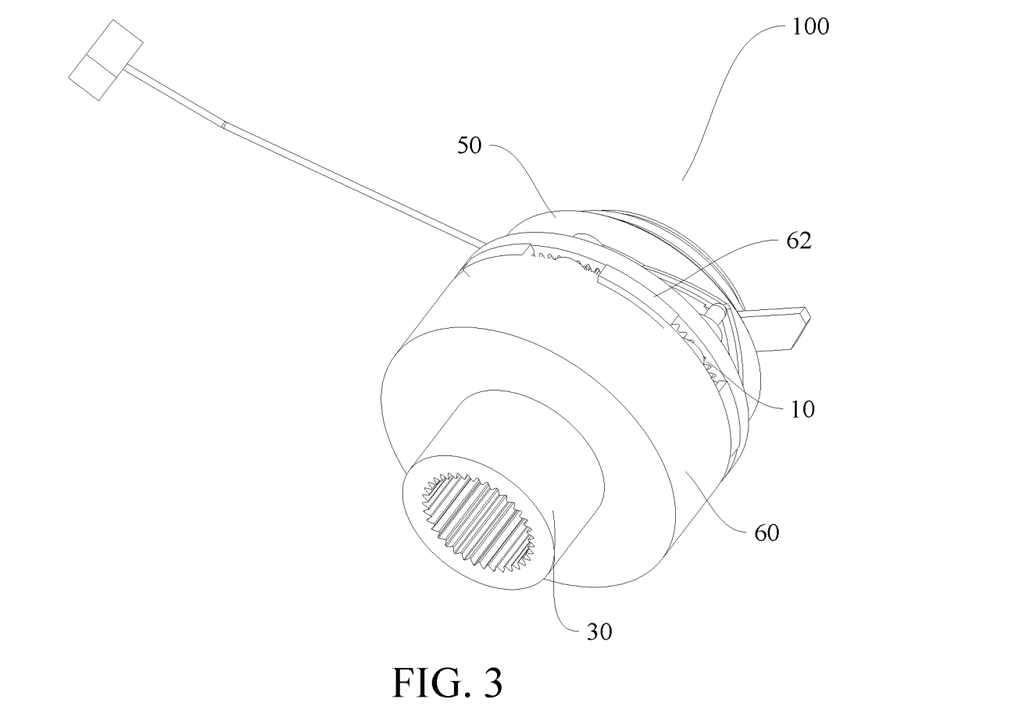
FIG. 3 is a structural diagram of a drive shaft locking device according to an embodiment of the present specification.

According to an embodiment of the present specification, as shown in FIG. 1 to FIG. 3, the first drive shaft 20 is connected with the sun gear 11, the second drive shaft 30 is connected with the gear ring 14, and the drive needle 51 penetrates through the planetary carrier 13. The planetary gear 12 is mounted on the planetary carrier 13 by the planetary gear shaft, and the drive needle 51 and the planetary gear shaft can be the same component. Therefore, by a reasonable arrangement of the length of the planetary gear shaft, the drive needle 51 can be eliminated. Furthermore, the planetary gear shaft is reliably arranged on the planetary carrier 13, so that the cost of the drive shaft locking device 100 can be lowered, and the number of the parts of the drive shaft locking device 100 can be reduced.

Of course, the present specification is not limited thereto. According to another embodiment of the present specification, the first drive shaft 20 is connected with the sun gear 11, the second drive shaft 30 is connected with the gear ring 14, and the drive needle 51 penetrates through the planetary carrier 13. The planetary gear 12 is mounted on the planetary carrier 13 by the planetary gear shaft, and the drive needle 51 and the planetary gear shaft are separated. The drive needle 51 and the planetary gear shaft are two independent components to reduce the change of the planetary carrier 13. By a reasonable arrangement of the drive needle 51, the drive shaft locking device 100 can achieve the corresponding locking function. Optionally, in the present specification, the drive needle 51 is parallel to the planetary gear shaft.

As shown in FIG. 1, two planetary carriers 13 can be provided. The two planetary carriers 13 are respectively arranged at two sides of the sun gear 11, and the drive needle 51 penetrates through the two planetary carriers 13. Since the drive needle 51 needs to be matched with the second joint part 42, the axial length of the drive needle 51 is larger. The arrangement of the drive needle 51 can be more stable by using two separated planetary carriers 13 and to improve the structural reliability of the drive shaft locking device 100. The drive needle 51 can be mounted coaxially to ensure that the drive needle 51 does not deviate when moving along the axial direction.

In some embodiments of the present specification, as shown in FIG. 1, FIG. 3, FIG. 5 and FIG. 6, the drive shaft locking device 100 can further comprise a sleeve 60, wherein the sleeve 60 is connected between the gear ring 14 and the second drive shaft 30. The second joint part 42 rotates along with the sleeve 60, and moves along the axial direction relative to the sleeve 60. The sleeve 60 and the second drive shaft 30 can be integrally formed, such that the sleeve 60 can be connected with the gear ring 14. The second joint part 42 may rotate along with the sleeve 60, so that the second joint part 42 can synchronously rotate with the second drive shaft 30 by the sleeve 60. The second joint part 42 is configured to move along the axial direction relative to the sleeve 60 so that it can move along the axial direction relative to the first joint part 41. Therefore, movements of the sleeve 60 and the second drive shaft 30 are not obstructed, and the structural reliability and working reliability of the drive shaft locking device 100 can be improved.

Figure 5:
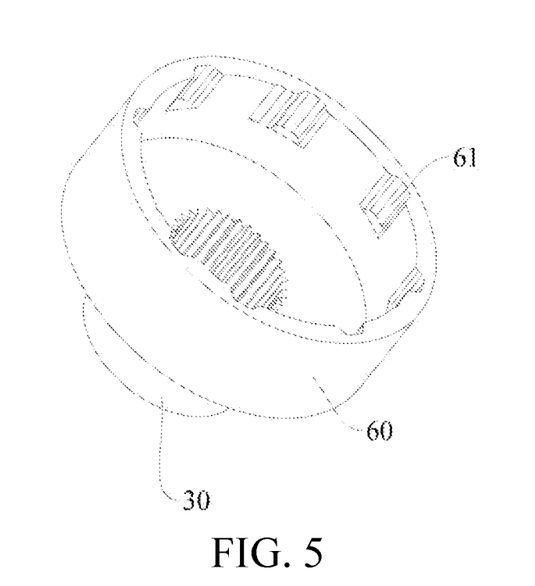
FIG. 5 is a structural diagram of a sleeve and a second drive shaft according to an embodiment of the present specification.

Further, as shown in FIG. 2 and FIG. 5, the sleeve 60 is provided with a sleeve axial groove 61, and the second joint part 42 is provided with a second joint part bulge 421. The second joint part bulge 421 is arranged in the sleeve axial groove 61 to enable the second joint part 42 to rotate along with the sleeve 60, and the second joint part 42 can move along the axial direction relative to the sleeve 60. The sleeve axial groove 61 extends along the axial direction, so that the axial movement of the second joint part bulge 421 in the sleeve axial groove 61 can be facilitated, the circumferential position of the second joint part bulge 421 can be limited, and the sleeve 60 can drive the second joint part 42 to synchronously rotate. A plurality of sleeve axial grooves 61 can be formed and uniformly distributed at intervals in the inner surface of the sleeve 60. A plurality of second joint part bulges 421 corresponding to the plurality of sleeve axial grooves 61 can be provided.

As shown in FIG. 1, the second joint part 42 can hollowly sleeve the first drive shaft 20 to reduce the axial size of the drive shaft locking device 100 and the volume of the drive shaft locking device 100. In addition, the arrangement reliability of the second joint part 42 can also be improved.

Figure 6:
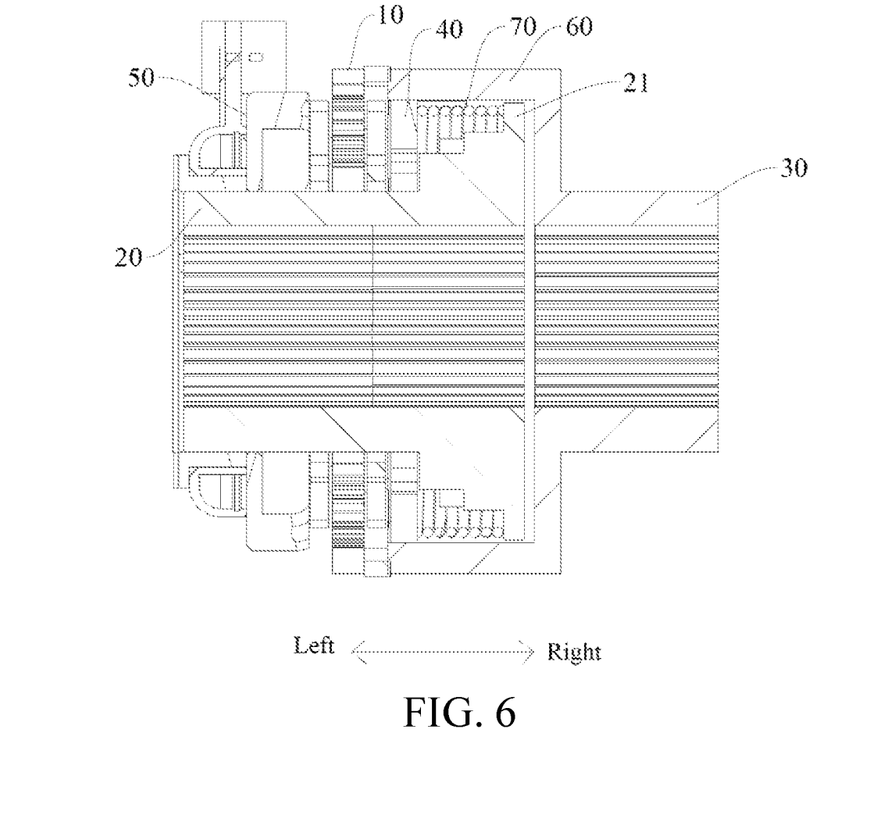
FIG. 6 is a sectional view of a drive shaft locking device according to an embodiment of the present specification.

In some embodiments of the present specification, as shown in FIG. 1 and FIG. 6, both the first joint part 41 and the second joint part 42 can be contained in the sleeve 60. Therefore, the sleeve 60 can protect the first joint part 41 and the second joint part 42. The lubricating oil leakage of the first joint part 41 and the second joint part 42 can be prevented, and the structural reliability of the drive shaft locking device 100 can be improved.

As shown in FIG. 1, the drive shaft locking device 100 can further comprise elastic devices 70, wherein the elastic devices 70 elastically press against the second joint part 42 to enable the second joint part 42 to move away from the first joint part 41. It can be understood that when the locking between the first drive shaft 20 and the second drive shaft 30 needs to be released, the second joint part 42 needs to move away from the first joint part 41. At this time, the braking part 522 stops braking the following part 521, the elastic devices 70 can drive the second joint part 42 to move away from the first joint part 41. The second joint part 42 and the first joint part 41 then are separated, so that the first drive shaft 20 and the second drive shaft 30 return to a normal working state.

In some embodiments, as shown in FIG. 2 and FIG. 6, the end surface of the first drive shaft 20 close to the second drive shaft 30 is provided with a first drive shaft flange 21. The first drive shaft flange 21 is opposite to the second joint part 42, and the elastic devices 70 elastically press between the first drive shaft flange 21 and the second joint part 42. By pressing the elastic devices 70 against one end of the first drive shaft flange 21, the arrangement reliability of the elastic devices 70 can be ensured, and the axial movement of the second joint part 42 can be facilitated. Preferably, the elastic devices 70 can be spiral springs. The spiral springs may reliably sleeve the first drive shaft 20, and the overall reliability of the drive shaft locking device 100 is better.

As shown in FIG. 2, the first joint part 41 sleeves is fixed on the first drive shaft 20, and the spiral springs are positioned at the outer side of the first joint part 41. Thus, on the one hand, the structural reliability of the first joint part 41 and the first drive shaft 20 can be improved. And on the other hand, the radial space of the first drive shaft 20 can be reasonably utilized, and the arrangement reliability of the spiral springs and the first joint part 41 can be improved.

In some embodiments of the present specification, as shown in FIG. 1 and FIG. 6, the elastic devices 70 can be contained in the sleeve 60 to improve the arrangement reliability of the elastic devices 70.

According to an embodiment of the present specification, as shown in FIG. 2, the first joint part 41 is provided with a plurality of first joint teeth 411 distributed along the circumferential direction, and the second joint part 42 is provided with a plurality of second joint teeth 422 distributed along the circumferential direction. It can be understood that when the first joint teeth 411 are matched with the second joint teeth 422, the first joint part 41 is jointed with the second joint part 42. By the arrangement of the plurality of first joint teeth 411 and the plurality of second joint teeth 422, the matching reliability of the first joint part 41 and the second joint part 42 can be improved.

In some embodiments, the second joint part 42 can be provided with a second joint part limiting groove, and one end of the drive needle 51 is positioned in the second joint part limiting groove. By forming the second joint part limiting groove, the matching reliability between the second joint part 42 and one end of the drive needle 51 can be improved, and the overall working reliability of the drive shaft locking device 100 can be improved.

The gear ring 14 can be arranged in multiple modes.

For example, optionally, the gear ring 14 may have an integrally-formed annular extension part, and the annular extension part constitutes the sleeve 60. Thus, on the one hand, the gear ring 14 and the sleeve 60 are reliably connected, and on the other hand, the manufacturing difficulty of the drive shaft locking device 100 can be reduced, and the cost of the drive shaft locking device 100 can be lowered.

Of course, the present specification is not limited thereto. As shown in FIG. 2 and FIG. 3, a plurality of arc-shaped connecting strips 62 are arranged between the gear ring 14 and the sleeve 60, the plurality of arc-shaped connecting strips 62 are distributed at intervals along the circumferential direction, and the plurality of arc-shaped connecting strips 62 are respectively welded and fixed with the gear ring 14 and the sleeve 60. In other words, each arc-shaped connecting strip 62 can fixedly connect the gear ring 14 with the sleeve 60. The connecting strips 62 are configured to be arc-shaped for matching the gear ring 14 and the edge of the sleeve 60 to improve the overall structure reliability of the drive shaft locking device 100.

As shown in FIG. 2, the first drive shaft 20 is connected with the sun gear 11, the second drive shaft 30 is connected with the gear ring 14, and the drive needle 51 penetrates through the planetary carrier 13. The planetary carrier 13 is provided with a plurality of convex plates which is distributed at intervals along the circumferential direction. The plurality of convex plates is divided into first convex plates 131 and second convex plates 132, and the first convex plates 131 and the second convex plates 132 are staggered in the circumferential direction. The first convex plates 131 are used for mounting the planetary gear shaft, and the second convex plates 132 are provided with drive needle support holes for supporting the drive needle 51. Thus, on the planetary carrier 13, the planetary gear shaft and the drive needle 51 do not interfere with each other to ensure the arrangement reliability of the drive needle 51 on the planetary carrier 13.

A power-driven system 1000 according to the embodiments of the present specification is described in detail below.

Figure 7:
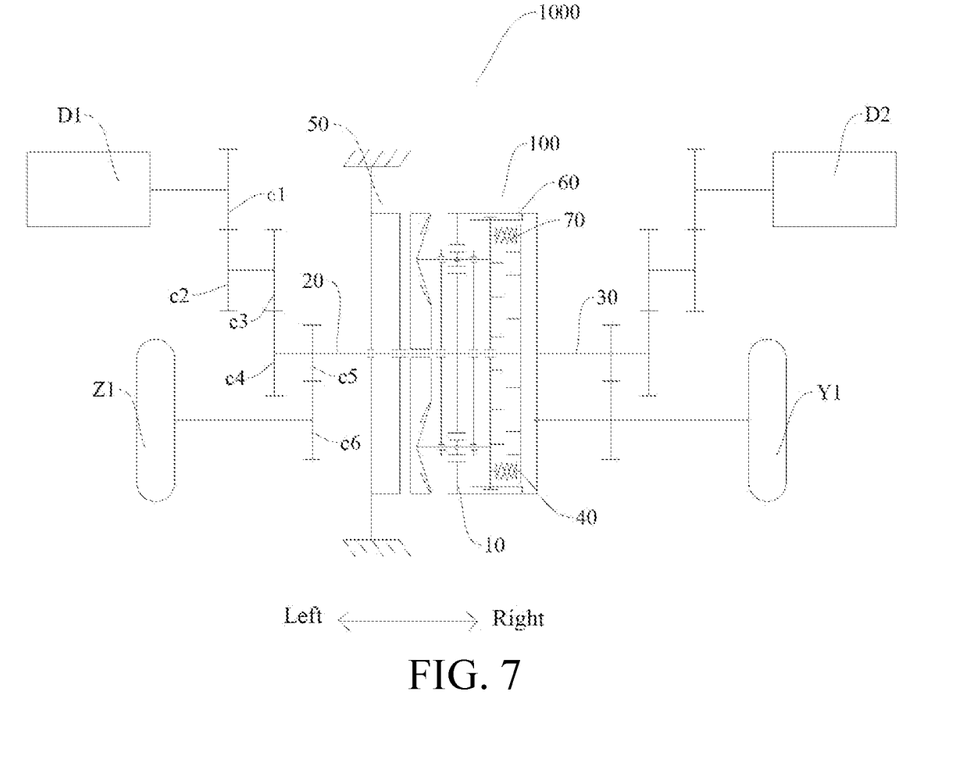
FIG. 7 is a schematic diagram of a power-driven system according to an embodiment of the present specification.
Figure 8:
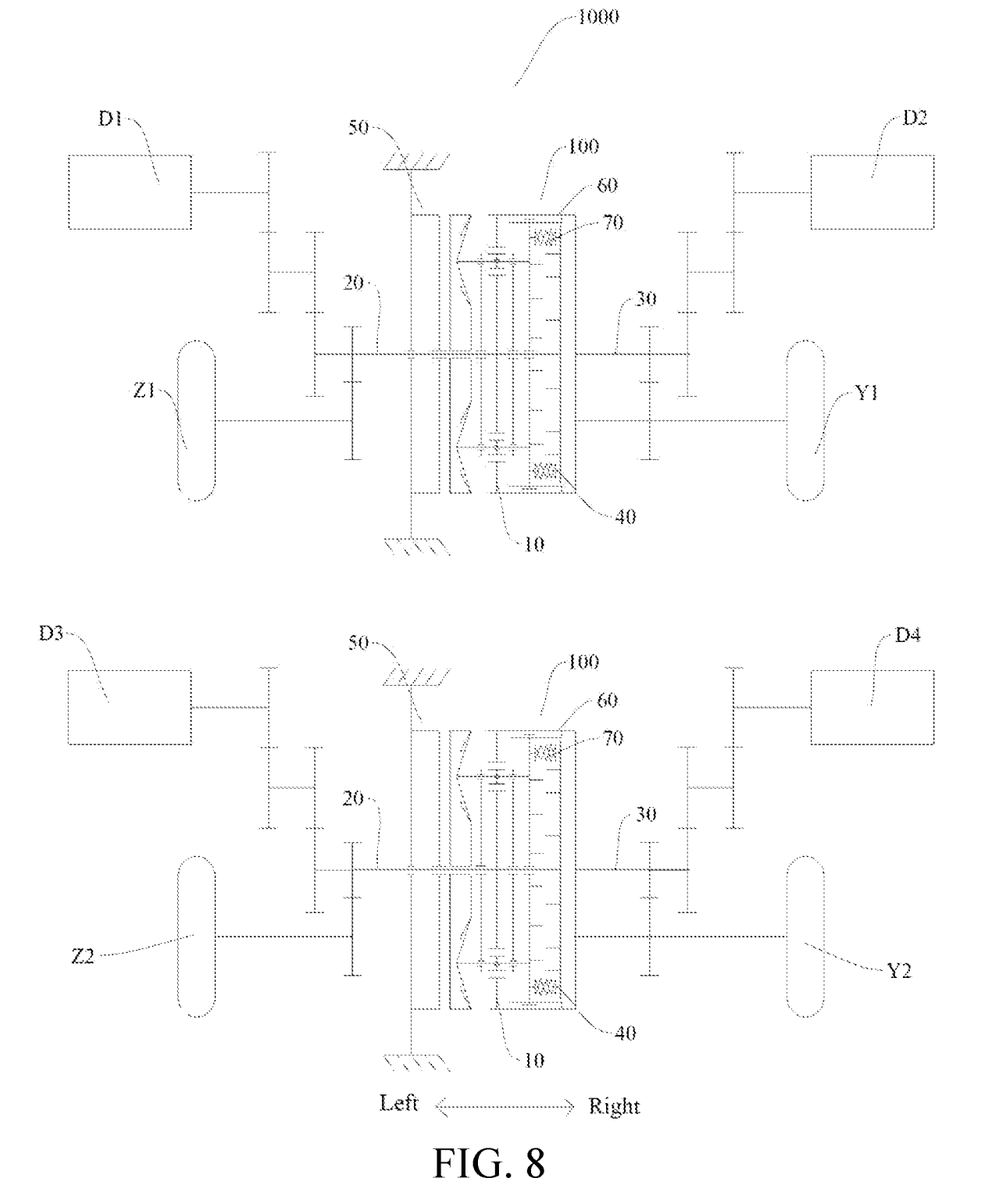
FIG. 8 is a schematic diagram of a power-driven system according to an embodiment of the present specification.

As shown in FIG. 7 and FIG. 8, the power-driven system 1000 may comprise the drive shaft locking device 100 for the vehicle according to the above embodiments, a first motor generator D1, and a second motor generator D2. The first motor generator D1 is in transmission with the first drive shaft 20 and outputs power to one of a pair of wheels. The second motor generator D2 is in transmission with the second drive shaft 30 and outputs power to the other one of the pair of wheels. When the drive shaft locking device 100 locks the first drive shaft 20 and the second drive shaft 30 together, the two wheels can synchronously rotate. When the drive shaft locking device 100 does not lock the first drive shaft 20 and the second drive shaft 30 together, the first motor generator D1 and the second motor generator D2 may work separately to drive the corresponding wheel rotating at a suitable rotation speed.

As shown in FIG. 7, in the power-driven system 1000, the drive shaft locking device 100 according to the above embodiments can be applied to one group of wheels. A first gear c1, a second gear c2, a third gear c3, a fourth gear c4, a fifth gear c5, and a sixth gear c6 are arranged between the first motor generator D1 and a left front wheel Z1. The first gear c1 is fixed on the motor shaft of the first motor generator D1, and the second gear c2 is meshed with the first gear c1. The second gear c2 and the third gear c3 are coaxially fixed, the third gear c3 is meshed with the fourth gear c4, the fourth gear c4 is fixed on the first drive shaft 20, and the fifth gear c5 is fixed on the first drive shaft 20. The half shaft of the left front wheel Z1 is connected with the sixth gear c6, and the fifth gear c5 is meshed with the sixth gear c6. Thus, the power of the first motor generator D1 can be transmitted to the left front wheel Z1 by the three groups of meshed gears. Of course, the first drive shaft 20 can also achieve some corresponding functions in transmission processes. The transmissions between the first gear c1 and the second gear c2 as well as between the third gear c3 and the fourth gear c4 can reduce the speed and increase the torque.

Of course, the present specification is not limited thereto. As shown in FIG. 8, in the power-driven system 1000, the drive shaft locking device 100 according to the above embodiments can be applied to two groups of wheels. For example, two drive shaft locking devices 100 can be provided. A first drive shaft locking device 100 may be matched in a left front wheel Z1 and a right front wheel Y1. The first motor generator D1 is in transmission with the first drive shaft 20 of the first drive shaft locking device 100, and the second motor generator D2 is in transmission with the second drive shaft 30 of the first drive shaft locking device 100.

The second drive shaft locking device 100 is matched in a left rear wheel Z2 and a right rear wheel Y2. A third motor generator D3 is in transmission with the first drive shaft 20 of the second drive shaft locking device 100, and a fourth motor generator D4 is in transmission with the second drive shaft 30 of the second drive shaft locking device 100.

The working processes and principles of the drive shaft locking device 100 according to the embodiments of the present specification are described in detail below with reference to the embodiments shown in FIG. 1 and FIG. 7.

When a vehicle runs normally along a straight line, the first motor generator D1 and the second motor generator D2 may work separately. A controller of the vehicle can control the first motor generator D1 and the second motor generator D2 to work in the same direction and at the same speed, so that the left front wheel Z1 and the right front wheel Y1 can rotate at the same speed and in the same direction.

When the vehicle turns normally, the controller can control the first motor generator D1 and the second motor generator D2 to work in the same direction and at different rotation speeds. For example, when the vehicle needs to turn left, the rotation speed of the first motor generator D1, which is in transition with the left front wheel Z1, can be less than the rotation speed of the second motor generator D2, which is in transition with the right front wheel Y1. Thus, the rotation speed of the right front wheel Y1 is greater than the rotation speed of the left front wheel Z1, so that the vehicle can turn left.

In the process that the vehicle runs normally along a straight line or the vehicle turns normally, pressed by the elastic devices 70, one end of the drive needle 51 in the drive shaft locking device 100 is positioned at the lowest point of the drive surface 523 of the following part 521. At this time, the drive needle 51 and the following part 521 may synchronously rotate.

When the vehicle is sliding, a driver may power on the electromagnetic brake to work, and the braking frame brakes the braking component to control the rotation speed of the braking component. The rotation speed difference may occur between the drive needle 51 and the braking component, and the drive needle 51 may slide on the drive surface 523 of the braking component. The drive needle 51 can slide from the lowest point of the drive surface 523 to the highest points or the positions adjacent to the highest points. The drive needle 51 moves towards one side of the second joint part 42 along the axial direction, and drive the second joint part 42 to gradually approach the first joint part 41 until the first joint part 41 is jointed with the second joint part 42. At this time, the first drive shaft 20 and the second drive shaft 30 synchronously rotate, thereby improving the capability of the vehicle to get out of sliding situation.

After the vehicle is out of the sliding situation, the driver can be powered off the electromagnetic brake by pressing the electromagnetic brake again. The elastic devices push the second joint part 42 to move away from the first joint part 41 along the axial direction. In this process, the drive needle 51 moves along the axial direction of the second joint part 42, one end of the drive needle 51 matched with the drive surface 523 can gradually slide to the lowest point from the highest points or the positions adjacent to the highest points. At this time, the second joint part 42 and the first joint part 41 are completely separated, and the vehicle can run normally along a straight line or to turn normally.

The vehicle according to the embodiments of the present specification comprises the power-driven system 1000 according to the above embodiments.

In the description of the specification, the description made with reference to terms such as "one embodiment", "some embodiments", "example", "specific example", or "some examples" means that a specific characteristic, structure, material or feature described with reference to the embodiments or examples are included in at least one embodiment or example of the present specification. In this specification, schematic descriptions of the foregoing terms do not need to refer to a same embodiment or example. In addition, the described specific features, structures, materials, or characteristics may be combined in a proper manner in any one or more of the embodiments or examples. In addition, a person skilled in the art may integrate or combine different embodiments or examples and characteristics of different embodiments or examples described in the specification, as long as they do not conflict with each other.

Although the above illustrations and descriptions refer to some embodiments of the present specification, it can be understood that, those embodiments are merely exemplary, and cannot be construed as a limitation to the present specification. Within the scope of the present specification, a person of ordinary skill in the art may make changes, modifications, replacements, and variations to the foregoing embodiments, which are also protected under the scope of the present specification.

What is claimed is:

1. A drive shaft locking device, comprising:
a planetary gear mechanism comprising a sun gear, a planetary gear, a planetary carrier, and a gear ring;
a first drive shaft connected with a first one of the sun gear, the planetary carrier, and the gear ring;
a second drive shaft connected with a second one of the sun gear, the planetary carrier, the gear ring;
a power joint device comprising a first joint part and a second joint part, wherein the first drive shaft is configured to synchronously rotate with the first joint part, and the second drive shaft is configured to synchronously rotate with the second joint part; and
a joint part drive device comprising a drive needle and a drive part, wherein the drive needle is configured to rotate around a central axis of the sun gear along with a third one of the sun gear, the planetary carrier, and the gear ring, and to move along the axial direction of the remaining one of the sun gear, the planetary carrier, and the gear ring, two ends of the drive needle are respectively matched with the drive part and the second joint part, and the drive part is configured to drive the drive needle to drive the second joint part to move towards the first joint part along the axial direction to join the second joint part with the first joint part.

2. The drive shaft locking device according to claim 1, wherein the drive part comprises:
a following part, wherein the following part rotates along with the drive needle, the following part has a drive surface, and when the following part is braked, the drive surface drives the drive needle to move along the axial direction by sliding the drive needle on the drive surface to join the second joint part with the first joint part.

3. The drive shaft locking device according to claim 2, wherein the drive part comprises:
a braking part configured to brake the following part.

4. The drive shaft locking device according to claim 3, wherein the drive part includes an electromagnetic brake comprising a braking component and a braking frame, the braking component includes the following part, and the braking frame includes the braking part.

5. The drive shaft locking device according to claim 2, wherein the drive surface comprises a first section and a second section, the first section is connected with the second section, a connection part of the first section and the second section is the lowest point, and other ends of the first section and the second section opposite from the connection part are the highest points.

6. The drive shaft locking device according to claim 2, wherein the following part comprises a following part body and an annular following part flange arranged on the following part body, and the drive surface is on an end surface of the following part flange facing the drive needle.

7. The drive shaft locking device according to claim 2, wherein the drive surface has a drive surface limiting groove, and one end of the drive needle is positioned in the drive surface limiting groove.

8. The drive shaft locking device according to claim 1, wherein
the first drive shaft is connected with the sun gear,
the second drive shaft is connected with the gear ring,
the drive needle penetrates through the planetary carrier, and the planetary gear is mounted on the planetary carrier by a planetary gear shaft, and the drive needle and the planetary gear shaft are the same component.

9. The drive shaft locking device according to claim 1, wherein
the first drive shaft is connected with the sun gear,
the second drive shaft is connected with the gear ring, and
two planetary carriers are respectively arranged at two sides of the sun gear, and the drive needle penetrates through the two planetary carriers.

10. The drive shaft locking device according to claim 1, wherein
the first drive shaft is connected with the sun gear,
the second drive shaft is connected with the gear ring,
the drive needle penetrates through the planetary carrier, and
the drive shaft locking device further comprises a sleeve, wherein the sleeve is connected between the gear ring and the second drive shaft, and the second joint part rotates along with the sleeve and moves along the axial direction of the sleeve.

11. The drive shaft locking device according to claim 10, wherein the sleeve has a sleeve axial groove, the second joint part has a second joint part bulge, and the second joint part bulge is arranged in the sleeve axial groove, so that the second joint part rotates along with the sleeve and moves along the axial direction of the sleeve.

12. The drive shaft locking device according to claim 10, wherein the second joint part hollowly sleeves the first drive shaft.

13. The drive shaft locking device according to claim 10, wherein both the first joint part and the second joint part are contained in the sleeve.

14. The drive shaft locking device according to claim 1, wherein the first joint part has a plurality of first joint teeth distributed along a circumferential direction of the first joint part, and the second joint part has a plurality of second joint teeth distributed along a circumferential direction of the second joint part.

15. The drive shaft locking device according to claim 14, wherein the second joint part has a second joint part limiting groove, and one end of the drive needle is positioned in the second joint part limiting groove.

16. The drive shaft locking device according to claim 10, wherein the gear ring comprises an integrally-formed annular extension part, and the annular extension part constitutes the sleeve.

17. The drive shaft locking device according to claim 10, wherein a plurality of arc-shaped connecting strips is arranged between the gear ring and the sleeve, is distributed at intervals along a circumferential direction of the gear ring, and is respectively welded and fixed with the gear ring and the sleeve.

18. The drive shaft locking device according to claim 1, wherein
the first drive shaft is connected with the sun gear,
the second drive shaft is connected with the gear ring,
the drive needle penetrates through the planetary carrier, and
the planetary carrier has a plurality of convex plates which is distributed at intervals along a circumferential direction of the planetary carrier, the plurality of convex plates is divided into first convex plates and second convex plates, the plurality of first convex plates and the plurality of second convex plates are staggered in the circumferential direction, the first convex plates are used for mounting the planetary gear shaft, and the second convex plates are provided with drive needle support holes for supporting the drive needle.

19. A vehicle, comprising:
the drive shaft locking device according to claim 1;
a first motor generator, wherein the first motor generator is in transmission with a first drive shaft and outputs power to one of a pair of wheels; and
a second motor generator, wherein the second motor generator is in transmission with a second drive shaft and outputs power to the other one of the pair of wheels.

20. A vehicle, comprising:
two drive shaft locking devices according to claim 1, the two drive shaft locking devices including a first drive shaft locking device and a second drive shaft locking device;
a first motor generator, wherein the first motor generator is in transmission with the first drive shaft of the first drive shaft locking device and outputs power to a left front wheel;
a second motor generator, wherein the second motor generator is in transmission with the second drive shaft of the first drive shaft locking device and outputs power to a right front wheel;
a third motor generator, wherein the third motor generator is in transmission with the first drive shaft of the second drive shaft locking device and outputs power to a left rear wheel; and
a fourth motor generator, wherein the fourth motor generator is in transmission with the second drive shaft of the second drive shaft locking device and outputs power to a right rear wheel.

* * * * *